(12) United States Patent
Fenlon

(10) Patent No.: US 10,404,634 B2
(45) Date of Patent: Sep. 3, 2019

(54) METHOD FOR PUBLISHING AND SHARING CONTENT ON THE INTERNET

(71) Applicant: Sean P. Fenlon, Marriottsville, MD (US)

(72) Inventor: Sean P. Fenlon, Marriottsville, MD (US)

(*) Notice: Subject to any disclaimer, the term of this patent is extended or adjusted under 35 U.S.C. 154(b) by 225 days.

(21) Appl. No.: 15/201,142

(22) Filed: Jul. 1, 2016

(65) Prior Publication Data

US 2017/0005959 A1    Jan. 5, 2017

Related U.S. Application Data

(60) Provisional application No. 62/187,576, filed on Jul. 1, 2015.

(51) Int. Cl.
| | |
|---|---|
| *H04L 12/58* | (2006.01) |
| *H04L 29/12* | (2006.01) |
| *H04L 29/08* | (2006.01) |

(52) U.S. Cl.
CPC ............ *H04L 51/046* (2013.01); *H04L 51/02* (2013.01); *H04L 51/066* (2013.01); *H04L 51/08* (2013.01); *H04L 61/1511* (2013.01); *H04L 61/303* (2013.01); *H04L 61/307* (2013.01); *H04L 67/2823* (2013.01)

(58) Field of Classification Search
CPC ..... H04L 51/046; H04L 51/066; H04L 51/02; H04L 51/08; H04L 67/2823; H04L 61/307; H04L 61/303; H04L 61/1511
USPC .................................................. 709/203, 206
See application file for complete search history.

(56) References Cited

U.S. PATENT DOCUMENTS

| | | | | |
|---|---|---|---|---|
| 5,937,160 A | * | 8/1999 | Davis ................ | G06F 17/30882 707/999.01 |
| 6,061,660 A | * | 5/2000 | Eggleston .............. | G06Q 30/02 705/14.12 |
| 6,151,624 A | * | 11/2000 | Teare ................ | H04L 29/12009 709/217 |
| 6,651,087 B1 | * | 11/2003 | Dennis ................. | G06Q 10/107 709/205 |
| 6,684,239 B1 | * | 1/2004 | Flepp ................... | G06Q 10/107 709/206 |

(Continued)

*Primary Examiner* — Philip J Chea
*Assistant Examiner* — Wing Ma
(74) *Attorney, Agent, or Firm* — Royal W. Craig; Gordon Feinblatt LLC

(57) ABSTRACT

A computer-implemented system and method for enabling publishing/sharing of content to a web page by sending an email to a centralized email address. This is accomplished with an email server that employs a modular array of software inclusive of a Message Monitoring System (MMS) software application, an interpretation layer software module (the "Interpeter Module"), and Message Posting System (MPS) software application. The MMS software automatically extracts messages, invokes the Interpeter Module to detect, the sending format and to provide necessary reformatting. The MMS software then invokes the MPS software which posts the reformatted message content to a designated web page at the assigned URL. Any user registered or not can post any content to a web page anytime simply by sending, the content to a singular email address (e.g, Post@abovo42.com). The present solution is easy to use and enables real-time publishing/sharing by multiple users.

2 Claims, 7 Drawing Sheets

(56) References Cited

U.S. PATENT DOCUMENTS

| | | | | |
|---|---|---|---|---|
| 6,836,792 | B1* | 12/2004 | Chen | G06Q 10/107 709/203 |
| 6,963,929 | B1* | 11/2005 | Lee | H04L 29/12009 370/351 |
| 7,103,680 | B1* | 9/2006 | Holdsworth | G06F 17/30569 707/999.01 |
| 7,698,372 | B2* | 4/2010 | Codignotto | G06Q 10/107 709/206 |
| 8,090,940 | B1* | 1/2012 | Fenton | H04L 63/126 709/206 |
| 8,312,381 | B2 | 11/2012 | Jorasch et al. | |
| 2002/0105545 | A1* | 8/2002 | Carter | G06F 3/0481 715/752 |
| 2003/0144903 | A1* | 7/2003 | Brechner | G06Q 10/107 705/14.47 |
| 2006/0004703 | A1* | 1/2006 | Spivack | G06F 17/3089 |
| 2007/0067400 | A1* | 3/2007 | Kawakami | G06Q 10/107 709/206 |
| 2008/0235330 | A1* | 9/2008 | Cardone | H04L 29/12584 709/203 |
| 2008/0294726 | A1* | 11/2008 | Sidman | H04L 29/12386 709/206 |
| 2009/0037492 | A1* | 2/2009 | Baitalmal | G06F 16/27 |
| 2009/0285205 | A1* | 11/2009 | Melick | H04L 51/14 370/352 |
| 2009/0292670 | A1* | 11/2009 | Manno | G06F 17/30637 |
| 2010/0005146 | A1* | 1/2010 | Drako | G06Q 10/00 709/206 |
| 2010/0017493 | A1* | 1/2010 | Codignotto | G06Q 10/107 709/206 |
| 2010/0318612 | A1* | 12/2010 | Agarwal | G06Q 10/107 709/206 |
| 2011/0219087 | A1* | 9/2011 | Jorasch | G06F 17/30899 709/206 |
| 2012/0198017 | A1* | 8/2012 | LeVasseur | H04L 51/24 709/206 |
| 2012/0246228 | A1* | 9/2012 | Udezue | H04L 12/1859 709/204 |
| 2013/0024522 | A1* | 1/2013 | Pierre | G06Q 10/10 709/206 |
| 2013/0031183 | A1* | 1/2013 | Kumar | H04L 51/06 709/206 |
| 2013/0046837 | A1* | 2/2013 | Rahja | H04L 51/18 709/206 |
| 2013/0346331 | A1* | 12/2013 | Giovannetti | G06Q 10/105 705/320 |
| 2014/0025693 | A1* | 1/2014 | Arora | G06F 17/2705 707/755 |
| 2014/0074948 | A1* | 3/2014 | Farkas | H04L 51/12 709/206 |
| 2014/0337444 | A1* | 11/2014 | Mizuta | H04L 51/28 709/206 |
| 2015/0100894 | A1* | 4/2015 | Kumar | H04L 51/06 715/752 |
| 2015/0156148 | A1* | 6/2015 | Doulton | H04L 51/063 709/206 |
| 2015/0236993 | A1* | 8/2015 | Notani | H04L 51/063 709/206 |
| 2015/0264111 | A1* | 9/2015 | Aleksandrov | H04L 51/08 726/4 |
| 2015/0381561 | A1* | 12/2015 | Meltzer | H04L 61/1511 709/206 |
| 2016/0087942 | A1* | 3/2016 | Yaguchi | H04L 63/08 726/4 |
| 2016/0142390 | A1* | 5/2016 | Draegen | H04L 63/08 726/9 |
| 2016/0315969 | A1* | 10/2016 | Goldstein | G06F 21/6218 |

\* cited by examiner

FIG. 5

METHOD FOR PUBLISHING AND SHARING CONTENT ON THE INTERNET

CROSS-REFERENCE TO RELATED APPLICATION(S)

The present application derives priority from U.S. provisional application Ser. No. 62/187,576 filed Jul. 1, 2016.

BACKGROUND OF THE INVENTION

1. Field of the invention

The present invention relates to a system and method for sharing of email content online and, more particularly, to an electronic mail (email) server configured for automatically copying content from an email directed to a pre-determined email address, and subsequently to a web page.

2. Description of the Background

Sharing digital content is important for any individual, group, or organization, including family, friends and business. The internet has provided a platform for communicating and sharing digital content online. For example, the original online communication technique was electronic mail or "email." Originally an ASCII text-only communications technique, internet email was extended by Multipurpose Internet Mail Extensions (MIME) to carry other digital content attachments. This allowed users to serially distribute a document between themselves by attaching, the document to an email message. User A would create document version 1.0 and email it to user B, who creates version 1.1 and emails it to user C, and so on. The limitations of this approach are apparent, and solution providers have attempted to streamline the process. A variety of content publishing/sharing websites exist today. All facilitate some aspect of publishing/sharing content among remote users in diverse geographical locations. Most are targeted to a particular use and/or allow publishing/sharing digital content on specific types of electronic files, e.g., word processing documents, calendars, spreadsheets, databases, multimedia presentations, audio and video content, computer-program code, etc. For example, Microsoft's OneNote® application facilitates a shared note-taking session between users using a shared session application program interface (API). OneNote® lets users create simple or complex notes from scratch, organize them into searchable, browse-able notebooks, and sync diem among a variety of platforms. OneNote® is great for note taking but is relatively poor at clipping existing content and sharing it.

OneNote's main competitor Evernote™ assigns users an email address such as [username].12345@m.evernote.com. Users can clip most anything and email it directly into their Evernote™ workspace. Emails sent to that address are then converted into an Evernote "Note." The subject line of the email is used for titling the note in accordance with a ruleset, e.g., use "Trip to Florida" followed by an @ symbol followed by the name of a destination notebook creates a note titled Trip to Florida in that notebook.

Similarly, U.S. Pat. No. 8,312,381 to Shutterfly, Inc. shows a system for posting content to a web site. In this instance, every user is assigned a unique email address to post their email content (e.g. SeanFenlon123@Shutterfly.com). When they clip and email content to that address the server(s) automatically extract content from the email and post the content to a web address at http://SeanFenlon123.Shutterfly.com. There are several drawbacks to this approach that limit its value as sharing solution. For one, all users need to be pre-registered with a Shutterfly account in order to receive the unique email address allowing them to post their email content. This is a problem because most software vendors are expected to provide free demonstration programs of their applications, and most users have come to expect a free "try-before-you-buy" demo of at least some of the functionality of the full software program in order to provide the customer with a feel for the functionality of the program.

Secondly, myriad email addresses must be specially set up for content submissions, and each of these email addresses is associated with a destination at a website. An email address can specify a website, a webpage or a section of a webpage at a website, or an image already displayed on a webpage at the website. Thus, users must be aware of many different email addresses, and the email addresses must themselves literally correspond to the webpage locations (or a cross-reference must exist).

Third, a complex software interpreter is required to monitor incoming emails at the email server and decide what to do with content submissions. For example, when an email is addressed to mysprotsteam.picture@nexo.com, the interpreter knows to extract image(s) attached or embedded in the email and post them to a pictures page at the website www.mysprotsteam.com. Any inline text in the email is automatically extracted from the email message and used to caption the pictures.

All of the foregoing detract from the utility in a true social sharing context and render the Shutterfly® system unsuitable for ad hoc social sharing of any content by email. What is needed is a system for posting content to a web site that requires no pre-registration, uses a single email address for all users, and which identically replicates an incoming email as a web page mirroring its content. This would allow any email user to post any content to a public website anytime ad hoc.

The present solution is easy to use, enables real-time publishing and sharing of digital content by multiple users, and facilitates, rather than constrains, the content publishing/sharing process.

SUMMARY OF THE INVENTION

According to a first aspect of the present invention, disclosed is a computer-implemented method for enabling publishing/sharing in the viewing of content by allowing users to post any email content to a web site without the problems described above. The present solution is easy to use, enables real-time publishing/sharing by multiple users and facilitates, rather than constrain, the publishing/sharing process.

The present system accomplishes the foregoing with an email server that is specially configured to handle an increased volume of content-laden emails all sent to a singular address (Post@abovo42.com). This is accomplished without multiple email servers or a load balancing strategy, to process a large email load without exceeding the capacity of an email server. The email server employs a modular array of software inclusive of a Message Monitoring System (MMS) software application, an interpretation layer software module (the "Interpeter Module"), and Message Posting System (MPS) software application. The MMS software automatically extracts messages, invokes the Interpeter Module to detect the sending format of the user's email client and to provide necessary stripping, reformatting and semantic markup capabilities when posting to the web page. This allows accurate visual inclusion of images, tables, as well as diagrams or mathematical formulae, which are otherwise difficult to reproduce as web content. The MMS software then invoke the MPS software which posts the reformatted message content to a web page at the assigned URL.

The system facilitates the present method, by which any user (registered or not) can post any content to a web site anytime, ad hoc, simply by sending the content to a singular email address (e.g, Post@abovo42.com). All such users are implicitly registered by simply by trying/using the service and may "opt-out" simply by deleting what was posted. In this scenario, any and all users (registered or not) can email content to one common easy-to-remember URL, e.g., Post@abovo42.com. For registered users the system automatically posts the content to a URL and sends a return email to the user that provides the URL along with the option to delete the posting. For non-registered users the system implements an opt-out model whereby the system automatically detects first-time users and sends back a return email that provides the URL to the terms of service (TOS) agreement for new user review. New users can accept the TOS, but if they do not accept the TOS they are prompted to delete their post. This effectively allows users to "un-register" simply by deleting the content that they posted.

The server will automatically create a web page that can be shared with anyone in the world, and the Interpreter Module will make an exact copy of the email, and post it to the web page. Any and all media that exists in the original email will be supported: video, audio, images, documents, pdfs, etc. If attachment can be attached to the email and sent, it will be completely accessible on the posted web page. Within seconds, the web page will be created and a return email with a public link, will be returned with embedded social media buttons for sharing.

In this manner any user can instantly turn any email and/or content that can be emailed into a publicly accessible web page, receive a return email with a URL-link to that web page, and share the web page URL as desired simply by accessing embedded social media controls in the return email, on the actual posted webpage itself or by copying/ pasting/emailing the URL by which the user can share it on their favorite social networks, save it, text it, etc.

Generally, the present system and method accomplishes the foregoing by the steps of:

$1^{st}$: providing a specially-configured large-volume email computer server and establishing an email address at the computer server, e.g., Post@abovo42.com;

$2^{nd}$: a user composing or forwarding an email using any commercially-available email client, in any format (ASCII, HTML, etc.), with or without attachments, and sending said email to said computer server by said established email address;

$3^{rd}$: the email server receives the email and automatically determines whether said user is a registered user or unregistered user;

$4^{th}$: If said user is registered, said email server automatically completes the following substeps,
  a. assigns a Uniform Resource Locator (URL) web address that indicates a protocol (e.g., HTTP), a hostname (e.g., www.abovo42.com), and a file name (e.g., a file location on the abovo42 server). Importantly, the file name is extracted and compiled from the sender's email address as will be described,
  b. invokes the interpreter Module which automatically extracts, reformats and posts the reformatted content to a web page at the assigned URL, and
  c. The email server automatically sends the registered user a return email containing 1) the URL link to said web page at a URL containing the sender's email address as folder/directory path of the URL (e.g. http://www.Abovo.com/SeanFenlon@Gmail.com/ 123456), and 2) embedded social media controls for sharing;

$5^{th}$: If said user is unregistered, said email server automatically completes the following substeps,
  a. said email server sends the unregistered user a return email containing a URL-link to the Terms of Service agreement along with the option to delete the posting and reject the Terms of Service with one click;
  b. If said user accepts said Terms of Service (TOS) and becomes a registered user, the email server completes steps/substeps 4 (a-c) above.

The above-described system for posting and publishing content to a web site implements an opt-out model by which new users can accept the TOS, but if they do not accept the TOS they are prompted and may elect to delete their post. This facilitates implicit registration after use, and any and all users (registered or not) can email content to a one common easy-to-remember URL, e.g. Post@abovo42.com.

For a more complete understanding of the invention, its objects and advantages refer to the remaining specification and to the accompanying drawings.

BRIEF DESCRIPTION OF THE DRAWINGS

Other objects, features, and advantages of the present invention will become more apparent from the following detailed description of the preferred embodiment and certain modifications thereof, in which:

Figure 5:
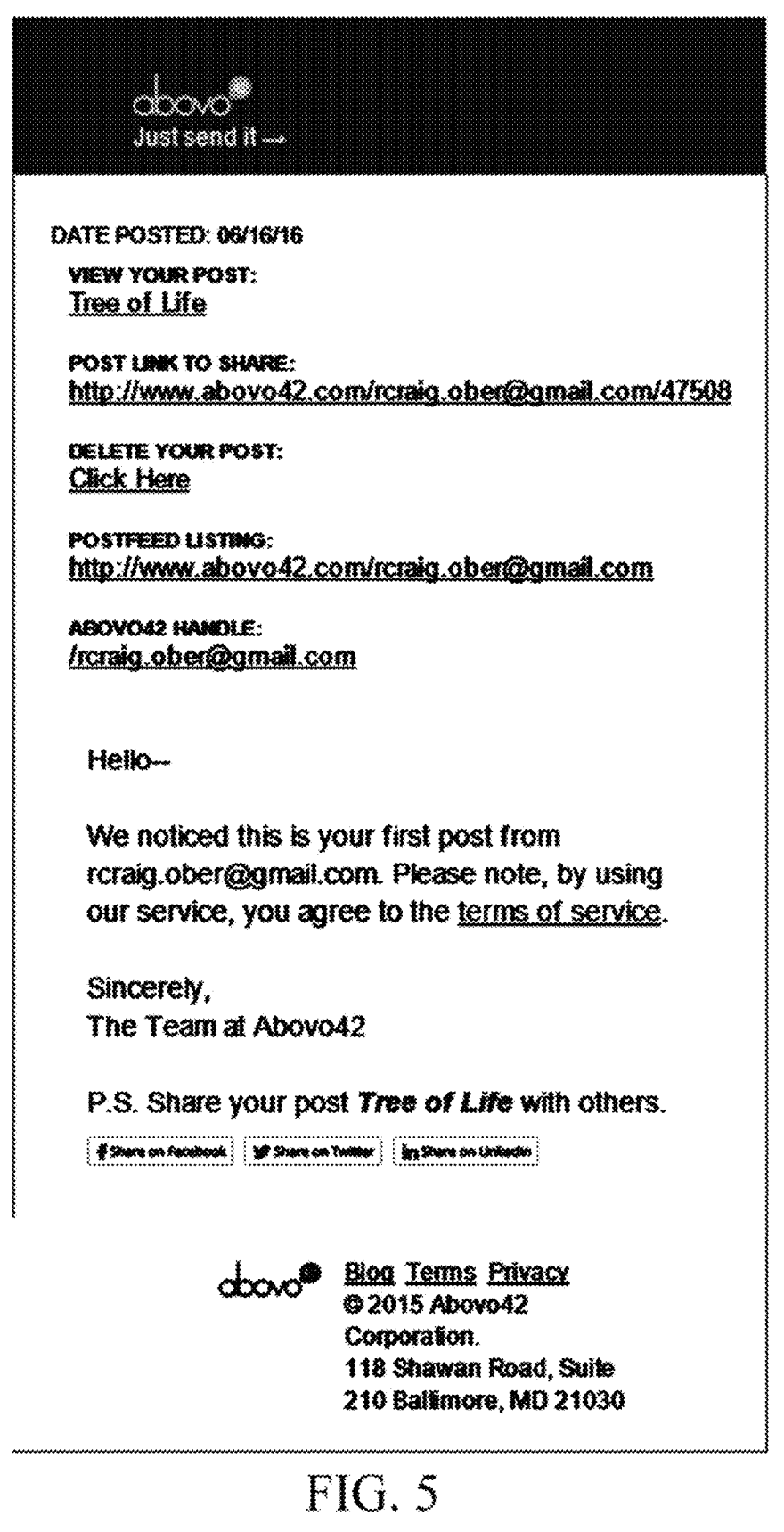

FIG. 5 is a screen shot of an exemplary return email containing the Terms of Service (TOS) agreement and a click-to-decline option to delete the posting and reject the Terms of Service.

DETAILED DESCRIPTION OF THE PREFERRED EMBODIMENTS

The present invention is a computerized system and method for publishing and sharing content on the internet by allowing users to post content to a web site via email. The system automatically copies content from an email directed to a pre-determined (but non-unique) email address, posts the content to a website located at a URL compiled from the sender's email address, and sends a return email containing the URL and providing options for deletion/removal. The system and method are easy to use and enable real-time publishing/sharing by multiple users.

Figure 1:
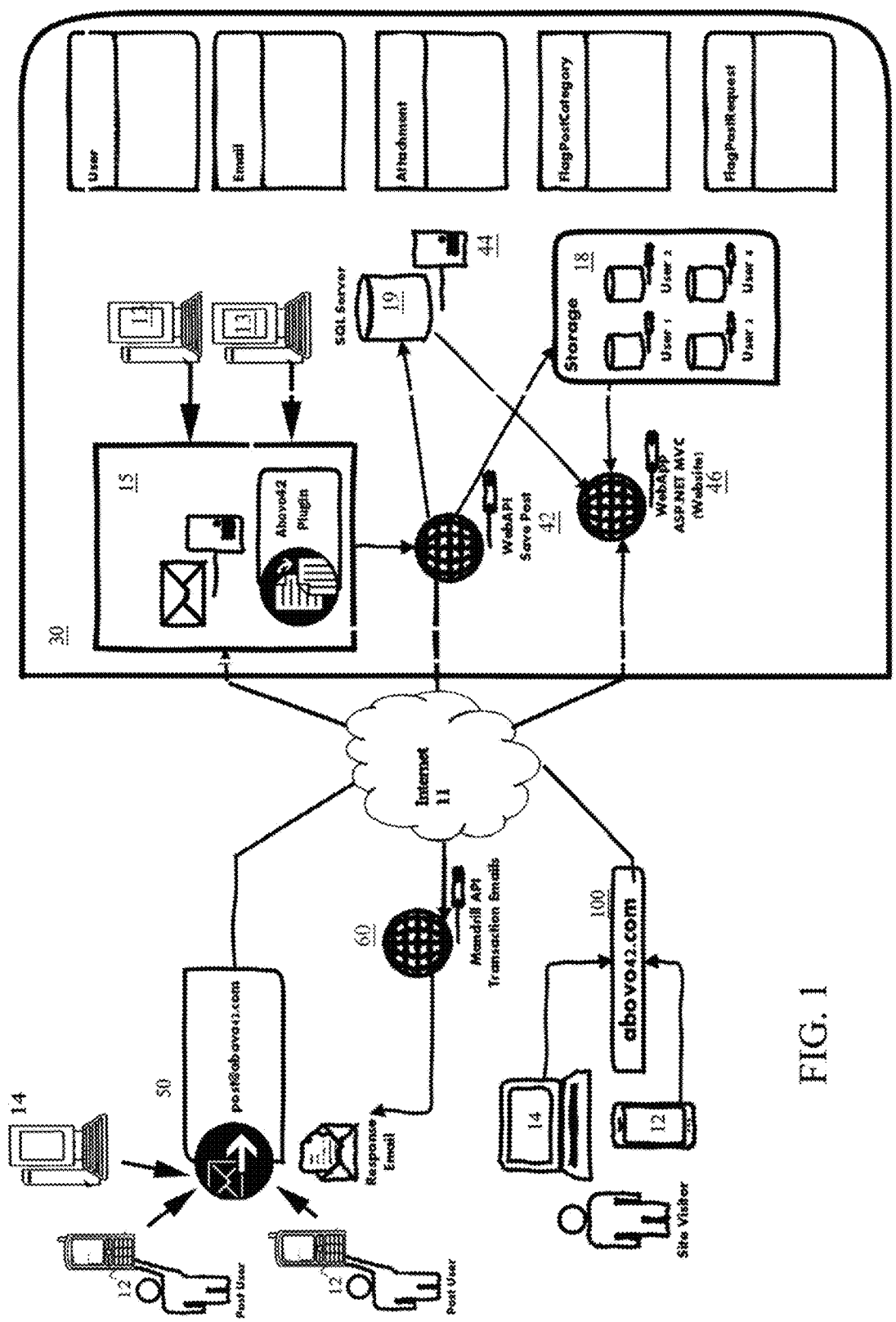
FIG. 1 is an illustration of the hardware architecture according to the present invention.

FIG. 1 is an illustration of the hardware architecture according to the present invention, which includes a distributed client-server hardware architecture that establishes a communication platform between users (both registered and non-registered). The system provides a content publishing/sharing solution to the users through a plurality of user devices, which may be portable devices 12 such as any email-enabled device including PDAs, cell phones and the like, or laptop/stationary personal computers 14. The user-computer devices 12, 14 each require an email client or mail user agent (MUA) to access and manage that user's email, in this embodiment being designated the Message Browser Application (MB) 50. The MB application 50 is a client program installed. locally on user-computer devices 12, 14. Alternatively, a web-based MUA may be used as described below. Suitable local email clients include but are in no way limited to Microsoft Outlook®, Windows Live Mail®, IBM Lotus Notes®, etc. MB application 50 preferably supports conventional email formats including HTML ASCII plain text. multi-part MIME format, etc. Computer devices 12, 14 may alternatively rely on a web-based mail application 100 that provides message management ("webmail"). Popular web-based email clients 100 include Gmail, Outlook.com and Yahoo! Mail. By either email or webmail each user computer 12, 14 is capable of authoring or forwarding digital content (including text and images, multimedia, audio, graphics, and video) into a record repository 18 resident in cloud-based server network 30. The cloud-based server network 30 includes a web-enabled email server 15 connected to the internet. The internet, or World Wide Web provides a known system for interconnecting portable devices 12 and client workstations 14 in a communicating relationship. Secure communication lines may be used between user portable devices 12 and user workstations 14 and cloud-based network 30 so that private data remains so. A we security appliance may be used, in which case it is preferably a unified threat management (UTM) appliance that combines several security features such as a firewall, content filtering, web caching, etc., as well as operating compatibility between the cloud-based network 30 and the Internet 11. A variety of suitable UTM security appliances are commercially available such as SonicWall™ UTM appliances.

The web-enabled email server 15 can be implemented as one or more server computers connected to each other either locally or remotely. The web-enabled email server 15 is configured to receive incoming messages from the Internet or local clients sent to the email server 15 through the Simple Mail Transport Protocol (SMTP). In this case the address is always internal, that is, within system 30 domain. The email server 15 is configured to extract and deliver incoming messages to a temporary message store which may be local or in record repository 18 described below. Email server 15 is also configured to create and/or maintain registered and unregistered user accounts in records repository 18 based on sender email addresses, and to receive, extract, filter, and organize incoming mail messages in association with the sender's email addresses/user account records so that they can readily be located and retrieved, no matter how the information in the messages is encoded.

To accomplish the foregoing, Email server 15 is configured with a modular array of software inclusive of a Message Monitoring System (MMS) software application 42, an interpretation layer software module (the "Interpeter Module") 44, and Message Posting System (MPS) software application 46, each comprising a module of software instruction stored on non-transitory computer memory.

The MMS software 42 automatically extracts messages when they are stored in the temporary message store (email server 15 or in record repository 18), selectively invoke the Interpeter Module 44 as needed to analyze and reformat the message content as desired, and to then invoke the MPS software 46 which posts the reformatted message content to a web page at the assigned URL.

The Interpeter Module 44 automatically reformats email content in HTML format suitable for posting to a web page at the assigned URL.

The MPS software module 46 automatically posts the reformatted message content to a web page at the assigned URL.

The web-enabled email server 15 is in communication with a web server 19 including web server software and a local or any distributed storage array, web server 19 being configured to store, process and deliver web pages to clients 12, 14 via the internet. The communication between clients 12, 14 and web server 19 takes place using the Hypertext Transfer Protocol (HTTP). The web server 19 is configured to map the path component of a Uniform Resource Locator (URL) supplied by email server 15 to a local file system resource wherein the URL path specified by the email server 15 is relative to the web server's 19 storage array root directory. The web-enabled email server 15 is also in communication with a user records repository 18 comprising a database server in communication with non-transitory computer memory, which may be local or any distributed storage array. The database server runs database management software to provide database services to cloud-based server network 30 to maintain user account information at least including email addresses for registered users of the network, as well as management information such as demographic and other statistical information for use in tracking service performance. As an example records repository 18 may host an SQL server database 19 running MySQL (a popular open source database). Other examples of suitable database servers are Oracle™, DB2™, Informix™, Ingres™, and SQL Server™.

Any number of administration terminals 13 are connected to the email server 15 by a direct data link or via external network. Administration terminals 13 can connect to that email server 15 in system 30 and are used to view and/or modify the configuration data set of system 30. The construction of terminals 13 are not particularly limited and may be any suitable computing device, such as a general purpose personal computer, which can execute an HTML browser.

Given the foregoing architecture, any and all of the users, registered or unregistered, may post content to a web site via email either for collaboration, self preservation, publishing, sharing, or any other reasons. The user may author content directly into an email, cut-and-paste content of any type (audio, video, text, graphics, tables, etc.) the email, or forward an existing email via their email client 50 or webmail 100 to a predetermined email address designating the client server network 30. Specifically, the client server network 30 is assigned an established top-level web domain or "DNS-entry" under the established Domain Name System (DNS), the internet's hierarchical distributed naming system for computers. As an example, the DNS-entry may be www.abovo42.com with assigned IP address 111.23.4.5. To receive email, each domain needs to have an MX-record, e.g., a DNS-entry that tells a sending, server (SMTP server) where to deliver the email. Thus, for www.abovo42.com, a typical MX-record may be:

| Abovo42.com | 3600 | IN | MX | 0 | postit.abovo42.com. |

This means that all emails sent to abovo42.com (i.e., Post@abovo42.com) are to be delivered to 'mail.abovo42.com' resident on client server network 30. Indeed, all emails addressed to abovo42.com will be delivered accordingly regardless of the sender address.

As indicated above the email server 15 in client-server network 30 runs a Message Monitoring System (MMS) software application 42, Interpeter Module 44, and Message Posting System (MPS) software application 46.

The MMS application 42 monitors email messages received from the internet and upon receipt of any email addressed to xyz@abovo42.com it is configured to automatically analyze the message format, selectively invoke the Interpeter Module 44 as needed to reformat the message content as needed, and then invoke the MPS 46 to post the email content to a web page on web server 19. The MMS 42 automatically copies content from the email, relies on the Interpeter Module 44 to reformat, and relies on the MPS 46 to post the content to a website located at a URL compiled from the sender's email address. Upon completion the MMS 42 sends a return email containing the URL and providing registration and publication options to the sender.

Figure 2:
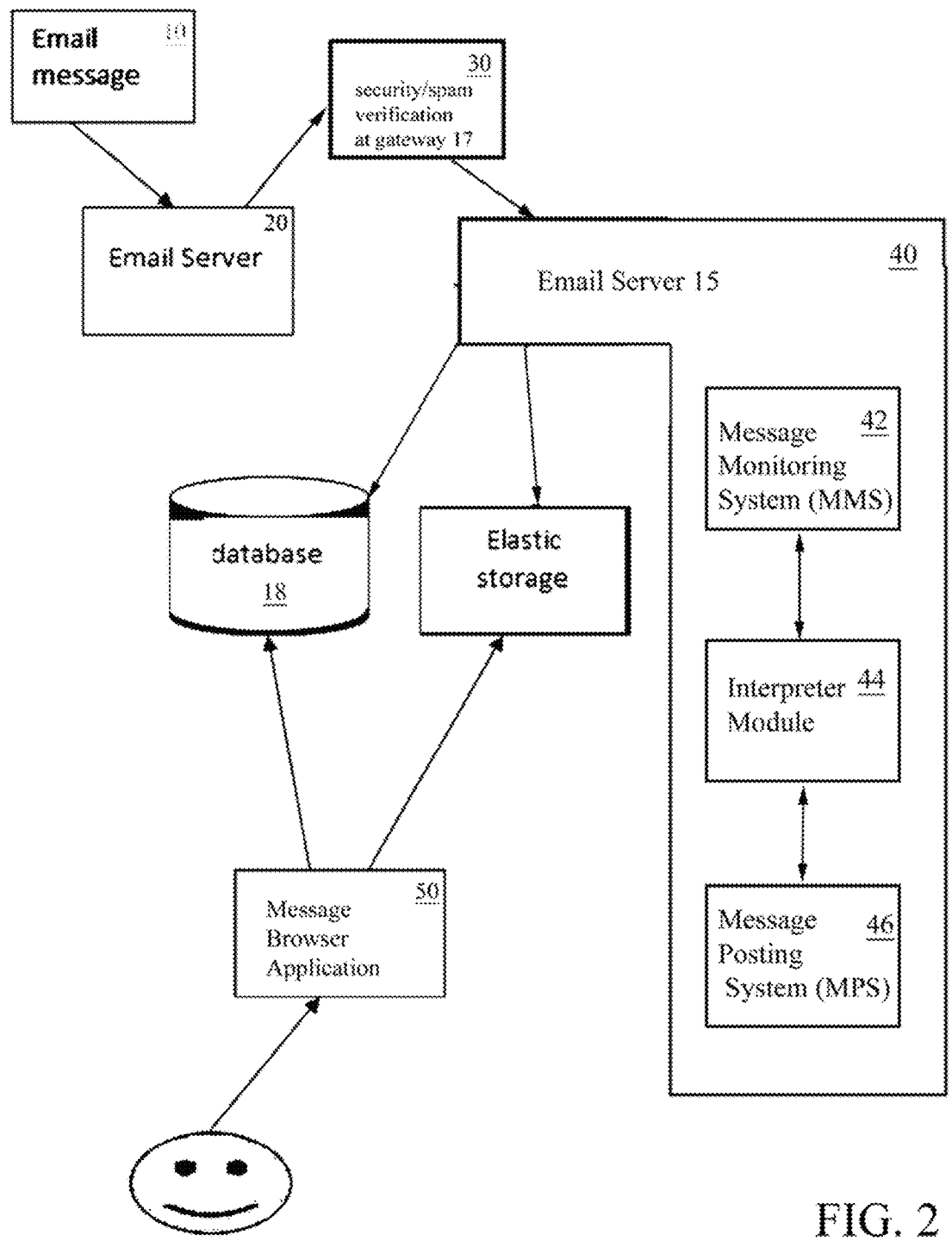
FIG. 2 is a block diagram of the method for content collaboration according to the invention.

FIG. 2 is a block diagram illustrating the above-described sequential operation.

At step 10 a user composes an email, and includes or copies content into it.

Figure 3:
FIG. 3 is a screen shot of an exemplary user-composed email.

FIG. 3 is a screen shot of an exemplary user-composed email. As indicated the email is sent to Post@abovo42.com.

At step 20 all external incoming email to abovo42.com is forwarded in accordance with the assigned MX-record to client server network 30.

At step 30 all external incoming email is subjected to necessary security/spam verification testing by email server 15.

Once cleared, at step 40 the email is available for retrieval by the email server 15. Email server 15 initially invokes the MMS application at substep 42. The MMS application 42 is programmed to carry out the following protocol on each message:

$1^{st}$: The MMS application 42 reads the email and mines two separate parts: 1) the email header (metadata); and 2) the original body of the email with any attachments.

$2^{nd}$: The mined email Metadata is stored in repository 18 (or cloud database) in association with the sender's email address;

$3^{rd}$: The email original body and all attachments are stored separately in some form of temporary Elastic Storage;

$4^{th}$: The MMS application 42 then invokes the Interpeter Module 44 as needed to reformat the message content (email original body and all attachments) stored in temporary Elastic Storage as needed. The Interpeter Module 44 analyzes the content, determines the format (ASCII, HTML, MIME, etc.), selectively strips the content to remove menus, ads, or other extraneous text that is not related to the content. For example, in the case of an HTML email, an algorithm can be used to remove common HTML from the document such as script tags, style tags, "br" tags, "hr" tags, "param" tags, "embed" tags, object tags and "&rsquo" tags, HTML comments, and other unnecessary HTML markup or metadata all of which are removed. The Interpeter Module 44 the subjects the content to an HTML parser to fix invalid HTML (e.g., so that each tag in the HTML document has both a start and a stop), improve the layout, balance all the remaining tags in the documents, and optimize the style of the resulting markup for web browsers. A variety of suitable open source HTML parses are available for this purpose.

$5^{th}$: The MMS application 42 then invokes the MPS application 46 for processing.

Once invoked, at step 50 the MPS application 46 carries out the following protocol:

$1^{st}$: the MPS application 46 analyzes the email Metadata stored in repository 18 and compares it to registration data to determining whether the user is a registered user or unregistered user;

$2^{nd}$: If the user is registered, the MPS application 46 analyzes the Metadata and resolves a unique string for identification of that user. The unique string is preferably the entire sender email address, but could include subdomains as well as the entire email header. In an embodiment, the MPS application 46 parses the sender's email address and reference line, and resolves a unique string comprising the user's email address and the text-entry in the user's reference line. Thus, for example, given the incoming message of FIG. 3 from rwcraig@ober.com in which Mr. Doe added the designator Tree of Life in his reference line, the MPS 46 will resolve http:www/Abovo42.com/rwcraig@ober.com/treeoflife where, http:// is the protocol being used (Hypertext Transfer Protocol or HTTP); .www.Abovo42.com is the filly qualified domain name of the web-enabled server rwcraig@ober.com is a main folder on the web server's 19 storage array root directory; and "treeoflife" is a sub-folder on the web server's 19 storage array root directory; and in combination the foregoing form a fully qualified, hierarchical path to a pre-existing web page at the resolved URL at the web server 19.

$3^{rd}$: The MPS 46 will then automatically extract the parsed content from Interpreter Module 44 and post the email original body and all attachments (stored separately in Elastic Storage) and copy them to a pre-existing web page at the resolved URL http://www.Abovo42.com/rwcraig@ober.com/treeoflife;

$4^{th}$: The MPS 46 auto-generates a return email and sends the registered user a return email containing the URL link: http://www.Abovo42.com/rwcraig@ober.com/treeoflife, and additionally containing, embedded social meta tags to optimize sharing via Twitter™, Facebook™, Google+™ and Pinterest™, etc. In addition, a comments section is provided by which viewers can share their opinions, experiences, point out mistakes, offer different perspectives and provide more information as desired.

Figure 4:
FIG. 4 is a screen shot of an exemplary return email containing the URL link and embedded social media tags, and comments section.

FIG. 4 is a screen shot of an exemplary return email containing the URL link and embedded social media tags, and comments section.

$5^{th}$: If the user is unregistered, the MPS 46 auto-generates a return email containing a Terms of Service (TOS) agreement and a click-to-decline option to delete the posting and reject the Terms of Service;

FIG. 5 is a screen shot of an exemplary return email containing the Terms of Service (TOS) agreement and a click-to-decline option to delete the posting and reject the Terms of Service.

$6^{th}$: If the user accepts the Terms of Service by acquiescence they become a registered user, the registration data is saved in repository 18 and the protocol proceeds to substeps 2-$4^{th}$ above.

$7^{th}$: if the user expressly declines the Terms of Service and chooses not to become a registered user, the mined email Metadata stored in repository 18 (or cloud database) and the original body and attachments stored in Elastic Storage are deleted.

A great advantage of the foregoing system is that a willing and registered user can target their email data and either append it to an existing web page or copy it to a new web page simply by tagging the email reference line appropriately.

Figure 6:
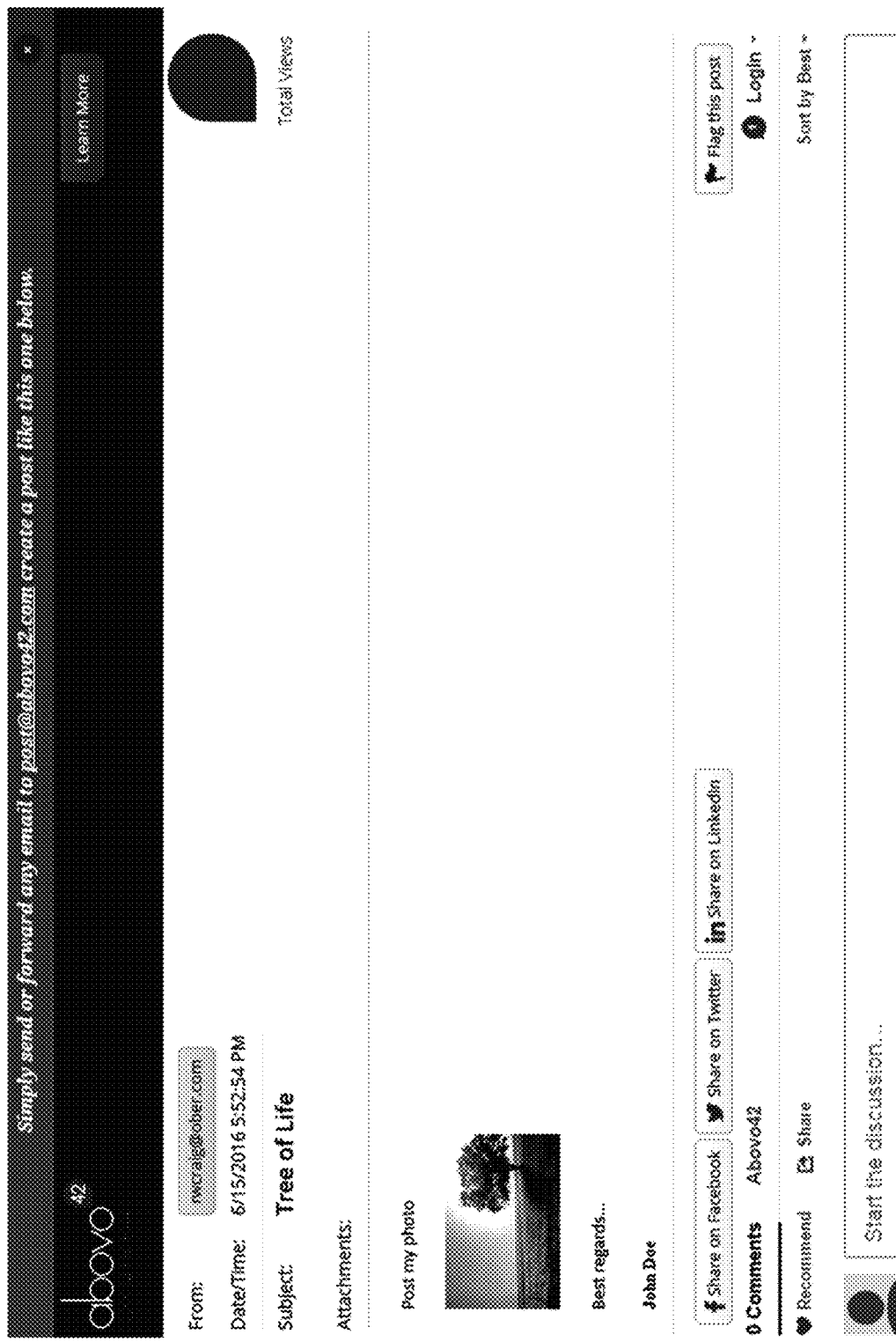
FIG. 6 is a screen-print of an exemplary webpage populated by email using the method and system for sharing content online according to the invention.

FIG. 6 is a screen-print of an exemplary website populated by email using the method and system for sharing content online according to the invention.

Figure 7:
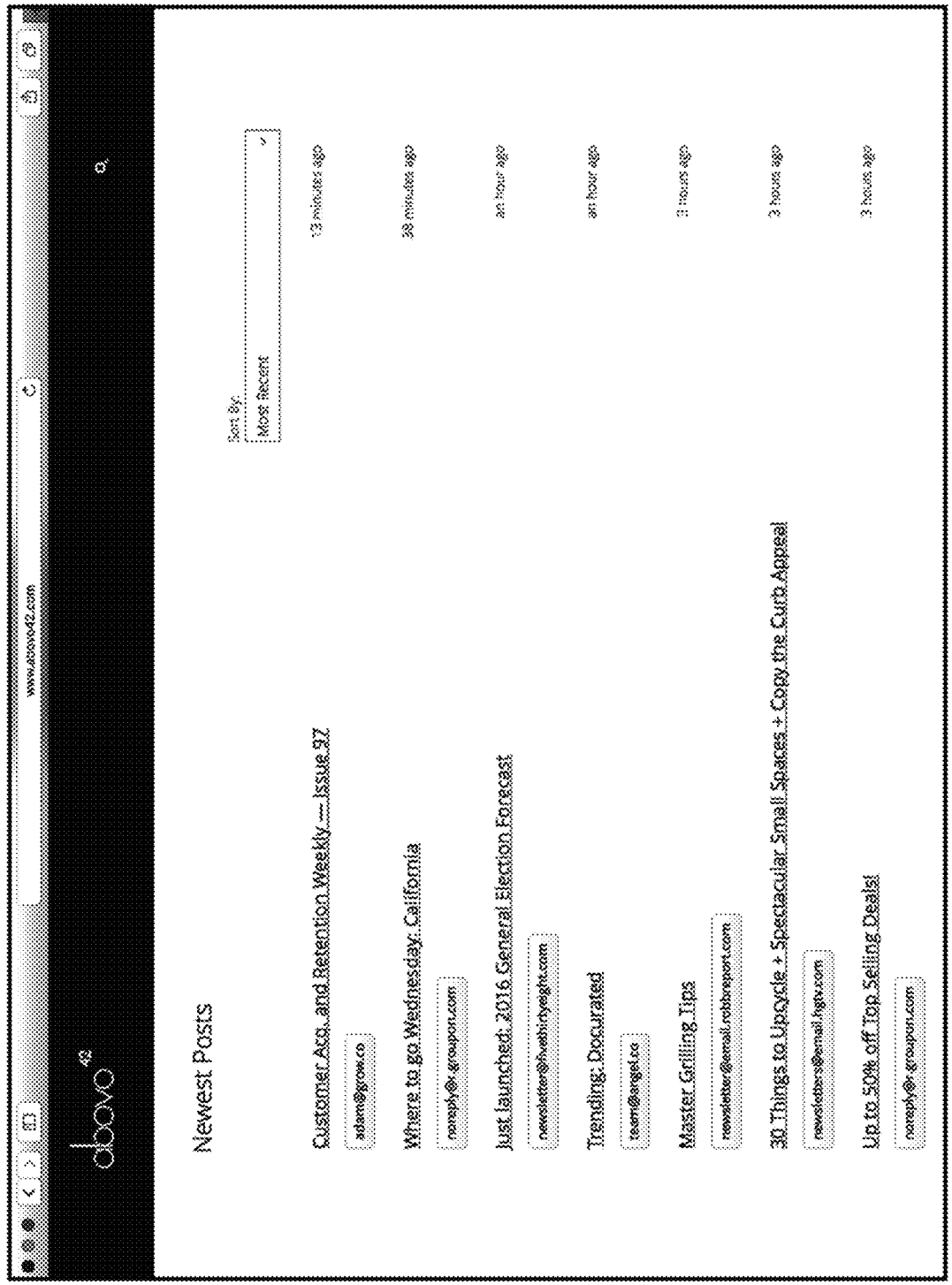
FIG. 7 is a screen print of the MB application email listing.

In addition to the MMS 42, MPS 46 and Interpreter Module applications 44, the present system 30 includes a Message Browser Application (MB) 50. In an embodiment the MB application 50 is configured as an SMS plugin application thin-client front end that is automatically "pushed out" downloaded and installed into each registered user's existing browser application when they first visit www.abovo42.com, thus, the MB application 50 is installed locally on user-computer devices 12, 14. The MB application may rely on an application programming interface (API) 60 as shown in FIG. 2, which may be an existing API such as Mandrill™. The MB application 50 is configured such that whenever the user visits the abovo42.com website with the MB application 50 running in the background, the MB application 50 effectively becomes an email browser for that user's emails. Alternatively, a web-based MB 50 may be used. FIG. 7 is a screen print of the MB application 50 email listing.

The MB application 50 is programmed to carry out the following protocol:

$1^{st}$: When the registered user visits abovo42.com with the MB application 50 running in the browser, the Metadata stored in database 18 is uploaded to the user and is formatted for display in the user's browser as a listing of emails similar to other email Web-based clients.

$2^{nd}$: When a user drills down and clicks on an individual email listed per above, the body along with references to all attachments are retrieved from the Elastic Storage and rendered in the most appropriate format for the browser.

$3^{rd}$: The MB application 50 also allows a registered user at remote stations 12, 14 or administrator 13 to set different level of permissions including for example, "No Access", "Reader", "Commenter", "Author". "Editor", or "Owner", so that other remote users can edit or contribute to a user's web pane to a controllable extent.

One skilled in the art will readily appreciate that the above-described system can be used for communication, media sharing, and management within groups of users. The system is available to anyone for posting content to a web site and allows registration simply by using/testing/trying, and any and all users (registered or not) can forward, create, and/or clip and email content to a one common easy-to-remember URL, e.g., Post@abovo42.com.

It should further be appreciated that the present invention can readily have further features added to it as the functionality of computers, and the costs thereof, change over time. All such straight forward additions and modifications fall within the scope of the present invention. Further, it is noted that the example described above may need to be altered in detail or in substance, depending upon the specific capabilities and software of the particular computer device used.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A computerized system for publishing and sharing content on the internet, comprising a modular array of computer software stored on non-transitory computer memory and including:

an MMS module comprising software instructions stored on non-transitory storage media for performing the steps of reading each incoming email, deriving from each said email an email header and an email body with attachments, and storing said header in a repository separate from said body and attachments;

an interpreter module comprising software instructions stored on non-transitory storage media for performing the steps of analyzing and reformatting the body of said email;

an MPS module comprising software instructions stored on non-transitory storage media for performing the steps of analyzing the email header, comparing said header to registration data to determine whether the sender is a registered user or unregistered user, auto-generating a return email containing a Terms of Service agreement, and further configured to execute the following sub steps, a. parsing the email header and resolving a top level URL from the sender address and resolving a subordinate DNS subdomain, the DNS subdomain being subordinate to said top level URL, b. automatically extracting and posting the reformatted email body from said interpreter module and all attachments stored separately to a pre-existing web page at the DNS subdomain; and c. automatically sending a return email to the sender email address containing the URL and confirming publication.

2. A computerized method for publishing and sharing content on the internet, comprising the steps of:

a. providing a web-enabled client server network having an assigned top-level DNS-entry with a record establishing delivery of emails sent to a predetermined email address at said top level domain entry;

b. receiving an email from a sender;

c. instantiating a Message Monitoring System (MMS) software application to automatically analyze the received message format, store the message header in one location, and store the body and attachments in another location, d. instantiating an interpreter software module for analyzing and reformatting said email body and attachments;

e. instantiating a Message Posting System (MPS) software application to compare said header to registration data to determine whether the sender is a registered user or unregistered user, automatically generate and send a return email containing a Terms of Service agreement, parse the sender address and resolve a top level URL there from, and and resolve a subordinate DNS subdomain, the DNS subdomain being subordinate to a top level URL, and to post the reformatted body and attachments to a web page at the DNS subdomain on the web-enabled client server network; and f. said MMS sending a return email to said sender containing the DNS subdomain and URL.

* * * * *